United States Patent

[11] 3,622,530

[72] Inventor Millo Branchesi
 Terni, Italy
[21] Appl. No. 709,907
[22] Filed Mar. 4, 1968
[45] Patented Nov. 23, 1971
[73] Assignee Montecatini Edison S.p.A.
 Milan, Italy
[32] Priority Mar. 7, 1967
[33] Italy
[31] 13,414 A/67

[54] TEXTILE FIBERS, FILMS, SHAPED ARTICLES AND THE LIKE PARTICULARLY STABLE TO HEAT, LIGHT AND AGEING
7 Claims, No Drawings

[52] U.S. Cl. ............... 260/23 S,
 260/23 H, 260/41 R, 260/41 C, 260/45.7 P,
 260/45.7 S, 260/45.75 K, 260/45.8 N, 260/45.85,
 260/45.9 R, 260/45.95
[51] Int. Cl. .................... C08f 45/58,
 C08f 45/60, C08f 45/62
[50] Field of Search ........................... 260/23 H,
 45.75 K, 23 S

[56] References Cited
UNITED STATES PATENTS
2,985,617 5/1961 Salyer et al. .................. 260/45.7
3,255,136 6/1966 Hecker et al. ................. 260/23

3,271,339 9/1966 Cappuccio et al. ............ 260/23

*Primary Examiner* — Donald E. Czaja
*Assistant Examiner* — Donald J. Barrack
*Attorney* — Hubbell, Cohen & Stiefel ABSTRACT: Stabilized poly-alpha-olefin compositions comprising polymer and up to 5 percent by weight thereof of stabilizing mixture of:
a. a thioester derived from thiodipropionic acid or from bis-β-hydroxyethyl sulfide (thiodiglycol);
b. a phosphite having the formula:

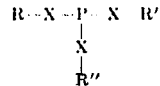

wherein X is oxygen or sulfur and R, R', R'' are the same or different radicals selected from the group consisting of unsubstituted or hydroxy substituted alkyl, aryl and alkylaryl radicals;
c. a phenolic antioxidizing agent;
d. an organotin compound;
e. a metallic soap, selected from the group consisting of the stearates of Ca, Mg and the like; and optionally a basic nitrogen containing polymer.

TEXTILE FIBERS, FILMS, SHAPED ARTICLES AND THE LIKE PARTICULARLY STABLE TO HEAT, LIGHT AND AGEING

1. Field of the Invention

The present invention relates to textile fibers as well as to films, tapes, or ribbons and the like, comprising poly-alpha-olefins, particularly crystalline poly-alpha-olefins, stabilized to heat, light and to ageing by a particular stabilizing mixture.

2. Description of the Prior Art

Various compounds are known to stabilize poly-alpha-olefins against the deleterious effects of heat and/or light and/or ageing. No one of these compounds, nor any mixture thereof known to me, has given the surprising degree of stabilization afforded by the particular combination of ingredients comprising the stabilizing mixture of the present invention.

SUMMARY OF THE INVENTION

I have surprisingly found that a mixture consisting of:
a. a thioester derived from thiodipropionic acid or from bis-Δ-hydroxyethyl sulfide (thiodiglycol); b. a phosphite having the formula:

wherein X is oxygen or sulfur and R, R', R'' are the same or different radicals selected from the group consisting of unsubstituted or hydroxy substituted alkyl, aryl and alkylaryl radicals; c. a phenolic antioxidizing agent; d. an organotin compound;
e. a metallic soap, selected from the group consisting of the stearates of Ca, Mg and the like; and optionally a basic nitrogen containing polymer, exerts a surprising degree of stabilizing action against the effects of light, heat and ageing, when incorporated in quantities equal to or less than 5 percent in olefinic polymers, which stabilized polymers are suitable for the production of fibers or films.

DESCRIPTION OF THE PREFERRED EMBODIMENTS

The stabilizing mixtures of this invention, are also effective for the stabilization of compositions comprising polyolefins and basic nitrogenous polycondensates which latter impart improved dyeability characteristics to the compositions. The stabilized compositions may be in the form of fibers, films, tapes or ribbons and the like. The stabilized compositions of the present invention may also be colored as by addition to the polymer/stabilizer mixtures, before extrusion, of organic or inorganic pigments or dyes.

The present invention thus provides polymeric compositions which are stabilized against heat, light and ageing, and which comprise:

A. a polymer of a monomer of the formula R—CH CH$_2$ wherein R is hydrogen or an alkyl or aryl radical and
B. a stabilizing mixture comprising:
a. a thioester derived from thiodipropionic acid or from bis-β-hydroxyethyl sulfide (thiodiglycol);
b. a phosphite having the formula:

wherein X is oxygen or sulfur and R, R'R'' are the same or different radicals selected from the group consisting of unsubstituted or hydroxy substituted alkyl, aryl and alkylaryl radicals, c. a phenolic antioxidizing agent;
d. an organotin compound;
e. a metallic soap, selected from the group consisting of Ca, Mg and the like; and optionally a basic nitrogen containing polymer.

The stabilizing mixture may be used in combination with pigments, dyes, fillers, etc.

The polyolefin is preferably isotactic polypropylene obtained by the stereospecific polymerization of propylene. Equally suitable for use in the present invention are other polymers of olefins of the formula $$R-CH=CH_2$$

wherein R is an alkyl or aryl radical, or hydrogen, for example polyethylene, polypentene-1, polypentene-1, poly-4-methylpentene-1, polystyrene and the like.

Particularly suitable thioesters include: dilaurylthiodipropionate, dioctadecylthiodipropionate, thiodiglycoldilaurate, thiodiglycoldioctadecanoate and the like.

Particularly suitable phosphites include: trilaurylphosphite, tris-lauryltrithiophosphite, triotadecylphosphite, trinonylphenylphosphite and the like.

Suitable phenols include: the o-hindered and p-substituted phenols, the polyphenols obtained by condensation of aldehydes and/or ketones with alkylphenols, triazinic phenols and the like.

Suitable organotin compounds include: the dialkyltinlaurates, -maleates and the like.

The components of the mixture are employed in ratios varying within wide limits; however, it is preferable that the thioester be present in quantity of at least 50 percent of the total weight of the stabilizers.

The mixing of the stabilizers with the polyolefin, according to the invention, is generally carried out by simple addition of the powders of the mixture of stabilizers with the polyolefins while stirring.

However, it is also possible to effect the admixture by other methods, such as the mixing of the polyolefins with a solution of the stabilizers in a suitable solvent followed by evaporation of the solvent itself, or by addition of the stabilizers to the polyolefins at the end of the polymerization.

It is furthermore possible to obtain the stabilizing action by applying the mixture onto the manufactured product, for instance by dipping the latter into a solution or dispersion of the stabilizing mixture and then evaporating the solvent.

The stabilizing mixtures of the present invention have good compatibility with the polyolefins in the molten state and exhibit no staining action.

The stabilized compositions may be granulated and then extruded by means of melt-spinning equipment, preferably through spinnerets of the type described in Italian Pat. No. 600,248, having a length/diameter ratio greater than 1.

The granulation and spinning are carried out by operating in the absence of oxygen, preferably in an atmosphere of inert gases (e.g., nitrogen). During the mixing, there may be added to the polyolefins, besides stabilizing mixtures of this invention, also opacifier agents and organic or inorganic dyeing pigments.

The filaments, after spinning, may be subjected to stretching treatment with stretching ratios between 1:2 and 1:10, at temperatures of from 80° to 150° C., in stretching devices heated by hot air or steam or similar fluid, or fitted with a heating plate.

It is, thus, possible to subject the filaments to a dimensional stabilization treatment with free or hindered shrinkage, at 80° to 160° C., according to the procedures described in Italian Pat. Nos. 566,914 and 588,318.

The filaments obtained by extrusion of the mixtures according to this invention may be either monofilaments or multifilaments, and are used for the preparation of continuous threads or staple fibers, or for the preparation of bulky filaments or staples.

Besides the preparation of filaments (yarns), the compositions according to this invention may be used also for the preparation of films, tapes and ribbons, shaped articles and the like.

The following nonlimiting examples are presented to further illustrate the present invention.

EXAMPLES 1-9

The stabilizing mixtures set forth in the following table were admixed with polypropylene at room temperature in a Henschel-type mixer. The polypropylene used had a melt-index of 2, and ash content of 0.075 percent, and a heptane extraction residue of 97.0 percent. The melt of the mixture in the test tube, at 250° C./10 min., had a light color.

The resulting mixtures were granulated in an extruder, in an oxygen-free atmosphere, at 180° C. Then filaments were prepared under the conditions and with the results set forth in the following table.

Examples 4, 6, 7 and 9 are presented for comparative purposes.

The remaining examples illustrate the invention.

$$R-X-P-X-R'$$
$$|$$
$$X$$
$$|$$
$$R''$$

wherein X is oxygen or sulfur and R, R', R'' are the same or different radicals selected from the group consisting of unsubstituted or hydroxy substituted alkyl, aryl and alkylaryl radicals;

c. phenol selected from the group consisting of hindered phenols, p-substituted phenols and polyphenols obtained by condensation of a member selected from the group consisting of alkylphenols and triazine phenols;

d. an organotin compound selected from the group consisting of dialkyltinlaurates and dialkyltinmaleates;

e. a metallic soap selected from the group consisting of the stearates of calcium and magnesium.

2. The composition of claim 1 wherein said poly-alpha-olefin is polypropylene substantially consisting of macromolecules having an isotactic structure.

3. The composition of claim 1 wherein said thioester is selected from the group consisting of dilaurylthiodipropionate, dioctadecylthiodipropionate, thiodiglycoldilaurate and thiodiglycol-dioctadecanoate.

|  | Example | | | | | | | | |
|---|---|---|---|---|---|---|---|---|---|
|  | 1 | 2 | 3 | 4 | 5 | 6 | 7 | 8 | 9 |
| Stabilizers, percent: | | | | | | | | | |
| (a) Dilaurylthiodipropionate | 0.6 | 0.6 | 0.6 | ---- | 0.6 | ---- | ---- | 0.6 | 0.6 |
| (b) Trilaurylphosphite | 0.15 | 0.15 | 0.15 | ---- | 0.15 | ---- | ---- | 0.15 | ---- |
| (c) 1.1.3-tri(2-methyl-4-oxy-5-tert.-butyl)butane | 0.05 | ---- | ---- | ---- | 0.05 | ---- | ---- | 0.05 | 0.05 |
| (d) Dibutyltinlaurate maleate | 0.05 | ---- | 0.05 | 0.05 | 0.05 | ---- | ---- | 0.05 | 0.01 |
| (c) 2.4-bis-n-octylthio-6(4'-oxy-3'5' ditert.butyl)aniline-1.3.5-triazine | ---- | 0.05 | ---- | ---- | ---- | 0.05 | ---- | ---- | ---- |
| (e) 2.6-ditert.butyl-p-cresol | ---- | ---- | 0.05 | ---- | ---- | ---- | 0.05 | ---- | ---- |
| (e) Calcium stearate | 0.1 | 0.1 | 0.1 | ---- | 0.1 | ---- | ---- | 0.1 | 0.1 |
| Spinning conditions: | | | | | | | | | |
| Temp. of screw, ° C | 300 | 300 | 300 | 300 | 300 | 300 | 300 | 300 | 300 |
| Temp. of extrud. head, ° C | 275 | 275 | 275 | 275 | 275 | 275 | 275 | 275 | 275 |
| Temp. of spinneret ° C | 275 | 274 | 275 | 275 | 275 | 275 | 275 | 275 | 275 |
| Temp. of spinneret, mm | 40/0.8×4 | 40/0.8×4 | 40/0.8×4 | 40/0.8×4 | 40/0.8×4 | 40/0.8×4 | 40/0.8×4 | 40/0.8×4 | 40/0.8×4 |
| Max. pressure (kg./cm.²) | 65 | 71 | 58 | 55 | 62 | 63 | 72 | 51 | 56 |
| Winding up speed (m./min.) | 300 | 300 | 300 | 300 | 300 | 300 | 300 | 300 | 300 |
| Stretching conditions: | | | | | | | | | |
| Temperature, ° C | 140 | 140 | 140 | 140 | 140 | 140 | 140 | 140 | 140 |
| Medium | Steam | Steam | Steam | Steam | Steam | Steam | Steam | Steam | Steam |
| Stretching ratio | 1:5 | 1:5 | 1:5 | 1:5 | 1:5 | 1:5 | 1:5 | 1:5 | 1:5 |
| Characteristics of stretched filament: | | | | | | | | | |
| Tenacity (g./den.) | 6.1 | 6.4 | 5.9 | 6.4 | 6.0 | 6.1 | 6.25 | 6.12 | 6.5 |
| Elongation (in percent) | 22 | 21 | 23 | 23 | 23 | 21 | 20 | 22 | 24 |
| Time for inducing oxidation at 180° C., in oxygen, on granulate (minutes) | 1,500-1,600 | 800 | 1,000 | 0 | 1,000 | 10 | 20 | 1,100 | 400 |
| Resistance of the filament or yarn in an air-flow oven, at 110° C. (time in days for obtaining brittleness) | 6 | 5 | 6 | 2 | 4 | 4 | 3 | 5 | 5 |
| Time in hours within which the tenacity of the filament is lowered to its half value in the fadeometer Atlas 18F, at 55° C., on a black panel, in an atmosphere of 60% of relative humidity | 150 | 180 | 180 | ---- | 120 | ---- | ---- | 140 | ---- |

Variations can, of course, be made without departing from the spirit and scope of this invention.

Having thus described my invention, what I desire to secure by Letters Patent and hereby claim is:

1. A polyolefin composition stabilized against heat, light and ageing, said composition comprising (1) a high molecular weight polymer of a monomer selected from the group consisting of compounds having the formula R—CH CH₂ wherein R is H or an alkyl or aryl radical and (2) an effective amount, up to 5 percent by weight of said polyolefin, of a stabilizing mixture comprising:
   a. a thioester derived from thiodipropionic acid or from bis-β-hydroxyethyl sulfide;
   b. a phosphite having the formula:

4. The composition of claim 2 wherein said thioester is selected from the group consisting of dilaurylthiodipropionate, dioctadecylthiodipropionate, thiodiglycoldilaurate and thiodiglcoldioctadecanoate.

5. The composition of claim 1 wherein said phosphite is selected from the group consisting of trilaurylphosphite, trilaurylthiophosphite, trioctadecylphosphite and trinonylphenylphosphite.

6. The composition of claim 1 which further includes a member selected from the group consisting of opacifiers and organic and inorganic dyeing pigments.

7. The composition of claim 1 in the form of textile fibers or films.

* * * * *

UNITED STATES PATENT OFFICE
CERTIFICATE OF CORRECTION

Patent No. 3,622,530   Dated November 23, 1971

Inventor(s) Millo Branchesi

It is certified that error appears in the above-identified patent and that said Letters Patent are hereby corrected as shown below:

Abstract, structural formula should read:

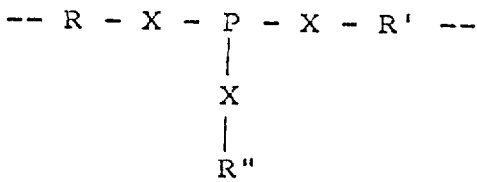

Column 1, line 25, "$\Delta$-hydroxyethyl" should read -- $\beta$-hydroxyethyl--;

Column 1, line 60, "R-CH CH$_2$" should read --R-CH=CH$_2$--;

Column 1, line 72, "R, R' R" " should read --R, R', R" --;

Column 1, line 75, "cals," should read --cals;--;

Column 2, line 16, "polypentene-1" (first occurrence) should read --polybutylene-1--;

Column 3, line 15, "and" (first occurrence) should read --an--;

Column 3, in the table, fourteenth line of type, alongside "Temp. of spinneret °C.", under "Example 2", "274" should read --275--;

Column 3, in the table, fifteenth line of type, "Temp. of spinner mm." should read --Type of spinneret, mm.--;

Column 3, line 62, "R-CH CH$_2$" should read -- R-CH=CH$_2$ --;

Signed and sealed this 18th day of July 1972.

(SEAL)
Attest:

EDWARD M. FLETCHER, JR.
Attesting Officer

ROBERT GOTTSCHALK
Commissioner of Patents

PO-1050
(5/69)

UNITED STATES PATENT OFFICE
CERTIFICATE OF CORRECTION

Patent No. 3,622,530              Dated November 23, 1971

Inventor(s) Millo Branchesi

It is certified that error appears in the above-identified patent and that said Letters Patent are hereby corrected as shown below:

Column 4, line 10, before "phenol" insert --a--;

Column 4, line 13, "consisting of alkylphenols and triazine phenols;" should read --consisting of aldehydes and ketones with a member selected from the group consisting of alkylphenols and triazine phenols;--.

Signed and sealed this 24th day of April 1973.

(SEAL)
Attest:

EDWARD M. FLETCHER, JR.             ROBERT GOTTSCHALK
Attesting Officer                      Commissioner of Patents